United States Patent Office 3,160,639
Patented Dec. 8, 1964

3,160,639
PREPARATION OF OXYGENATED COMPOUNDS BY OZONE INITIATED OXIDATION
Robert B. Long, Wanamassa, Carl E. Heath, Nixon, and Victor Kevorkian, Roselle Park, N.J., assignors to Esso Research and Engineering Company, a corporation of Delaware
No Drawing. Filed May 19, 1960, Ser. No. 30,035
13 Claims. (Cl. 260—346.1)

This invention relates to a method for partially oxidizing hydrocarbons and substituted hydrocarbons to obtain oxygen substituted derivatives thereof. In particular, this invention relates to the use of ozone in critical amounts and at low temperatures in a vapor phase noncatalytic partial oxidation reaction to increase the selectivity to valuable oxygenated products, thus decreasing the loss to carbon oxides. More particularly, this invention relates to increasing the product selectivity to epoxy compounds in vapor phase oxidation at relatively low temperatures by employing about 0.05 to 8 volume percent ozone in the oxidizing gas. With highly aromatic feeds, this combination effects the production of valuable olefinic compounds as well as oxygenated products.

This application is a continuation-in-part of application S.N. 751,855, filed July 30, 1958, now abandoned.

Epoxides constitute a valuable and versatile group of compounds which are finding an ever-increasing employment in the chemical industry. As such they may be used as solvents or may be polymerized according to methods well known in the art to form a variety of valuable polymeric products. They are also valuable as intermediates for the production of a wide range of chemical compounds due to the reactive epoxy group in the structure. Thus they may be isomerized to ketones over platinum or copper comprising catalyst, dehydrated to form diolefins, or caused to enter into substitution reactions with various reactive groups to synthesize a wide variety of valuable products.

It is well known in the art to partially oxidize hydrocarbons. Generally, this partial oxidation is carried out in liquid phase in the presence of specific solvents and the products obtained range from lower molecular weight oxygenated hydrocarbons such as aldehydes, acids, ketones, esters and the like to higher molecular weight resinous oxidation products. In liquid phase oxidation, one of the criteria for determining the product composition is a selection of a particular solvent. It is well known, for example, that acetic acid may be employed as a solvent for liquid phase oxidation to direct the reaction toward the production of specific oxygenated products. It is also well known that specific catalysts are selective toward production of certain oxygenated compounds. There are, however, many shortcomings with regard to liquid phase partial oxidation involving reaction rates, separation problems, etc. In recent years considerable emphasis in the art has been placed on vapor phase partial oxidation techniques.

Utilizing a conventional vapor phase noncatalytic partial oxidation technique, it is possible to obtain what has been considered reasonable yields of valuable epoxy compounds such as tetrahydrofuran and derivatives thereof as well as many other epoxy compounds. These selectivities, however, in the main are appreciably lower than 50%. For example, selectivity to epoxy compounds from n-heptane by prior art noncatalytic vapor phase partial oxidation processes is considered good when it is in the order of 35–38%, the bulk of the remainder of oxygenated compounds being olefins, carbonyls and non-condensable gases. It has now been discovered that extremely high selectivities toward epoxy compounds in the order of 70—90% and higher can be obtained by a method which comprises contacting the hydrocarbon feed with an oxygen-containing gas at low temperatures and pressures, to be defined hereafter, in vapor phase and in the presence of a small amount of ozone, preferably 0.1 to 1.0 volume percent ozone based on oxygen.

It has been found that the use of ozone employed with $O_2$ within the limits herein set forth throughout the reaction is necessary to the production of high yields of epoxy compounds. The $O_2$ employed may range from about 0.05 to 2, preferably from 0.25 to 1.5, moles of $O_2$ per mole of hydrocarbon feed.

The ozone when employed in the prescribed amounts permits lowering the initiation temperature several degrees and the overall reaction temperature is similarly lowered to this extent. It is pointed out, however, that the ozone must be maintained below a certain level to avoid ozonolysis resulting in an undesired product insofar as this invention is concerned. More particularly, the ozone content in oxygen-containing gas must be maintained below concentrations effecting a substantial production of ozonides which for the present purposes are undesirable and would detract from the yields of valuable epoxy compounds. Moreover, the formation of ozonides in this process would be hazardous.

The reactor design employed for vapor phase noncatalytic modified partial oxidation reaction of this invention is of no particular criticality since numerous designs may be employed with results differing only in degree. The partial oxidation reaction is highly exothermic and an efficient technique for temperature control must be employed. Runaway temperature will result in complete combustion of the feed resulting in the production of oxides of carbon and water. There are many factor designs which may be employed. For example, a simple open tube-type reactor is amenable to this reaction if it is immersed in a cooling bath or if it contains other means for rapid exchange of heat to control the temperature resulting from highly exothermic partial oxidation reaction. Another reactor design which has recently been developed involves the "raining solids" technique wherein finely divided inert solids are continually dispersed in a relatively homogeneous manner through the reactor in an amount sufficient to maintain the desired temperature but insufficient to quench the reaction. The reaction is readily quenched on contact with solids having a large surface area. In this last described design the inert solids are allowed to rain down through the reaction mixture under essentially free-fall conditions. This is illustrated, for instance, in U.S. Patent 2,872,472 of Fenske et al.

Still another reactor design which is particularly suitable for carrying out the reactions is described in application S.N. 755,184, filed August 15, 1958, now U.S. Patent No. 2,981,747 which provides highly efficient mixing with short residence times in a swirling gaseous stream wherein reaction products are continuously backmixed with incoming reactants. It is to be understood, however, that this invention does not reside in nor rely on any particular reactor design and the above disclosures merely exemplify typical available techniques for the partial oxidation of hydrocarbons.

In accordance with this invention a gas containing molecular oxygen which may be pure oxygen, air, or oxygen diluted with inert gases such as nitrogen or the like is admitted to the reaction zone with the vaporized feed. The use of nitrogen is one effective technique for controlling temperature. If desired, the feed may be passed into the reaction zone at a point different from the inlet for the oxygen containing gas and a plurality of feed and/or oxygen inlets may be employed. The feed should be preheated to a temperature in the range of about 300° to 800° F. or, in functional language, above the initiation temperature under the conditions employed. The ozone containing gas should not be preheated above 250° F. While the actual initiation temperatures utilized will vary in accordance with a particular feed, they will in accordance with this invention range between about 300° to 750° F. at 0 to 300 p.s.i.g. pressure. Initiation temperatures are generally slightly lower than maintainable reaction temperatures, e.g. 25°–300° F. lower. Selectivities are enhanced by maintaining the reaction temperature as low as possible. The reaction is therefore preferably carried out at temperatures in the range of about 300° to 600°, and more preferably 300° to 500° F. The lower molecular weight hydrocarbons are more difficult to oxidize and require somewhat higher initiation temperatures but within the aforementioned range. Conversely, the higher molecular weight hydrocarbons oxidize with more ease and should be subjected to less severe conditions than the lighter feedstocks. The residence time within the reactor under reaction conditions will vary between 0.01 to 10 seconds, again depending upon a particular feed and type of apparatus employed. The more difficulty oxidizable hydrocarbons require residence time in the upper portion of this range.

The feedstocks which may be most advantageously employed in the present modified noncatalytic vapor phase partial oxidation reaction include both saturated and unsaturated, acyclic and cyclic, aliphatic hydrocarbons, e.g. $C_3$ to $C_{20}$ paraffins, and olefins, and alkyl aromatic hydrocarbons wherein at least one alkyl substituent contains 2 or more carbon atoms, e.g. $C_8$ to $C_{20}$ alkyl aromatic hydrocarbons, and halogen substituted hydrocarbon derivatives thereof wherein at least one hydrogen atom is replaced by a halogen.

The aforementioned paraffin feedstocks include propane, butane, pentane, hexane, heptane, octane, nonane, decane, undecane, dodecane, tridecane, tetradecane, pentadecane, hexadecane, heptadecane, octadecane, nonadecane, and eicosane including the cyclic and the straight, and branched-chain acyclic isomers thereof. The aforementioned $C_3$ to $C_{20}$ olefins include compounds such as propene, 1-butene, 1-pentene, 1-hexene, 1-heptene, 1-octene, 1-nonene, 2-decene, 1-undecene, 3-dodecene, 1-tridecene, 1-tetradecene, 1-hexadecene, 1-octadecene, 1-nonadecene and 1-eicosene including the cyclic, the straight and branched-chain acyclic, and position isomers thereof.

The aforementioned $C_8$ to $C_{20}$ alkyl aromatics include such ethyl benzene, isopropyl benzene, 1-ethyl-4-isobutyl-benzene, isohexyl benzene, triethyl benzene, nonyl benzene, dodecyl benzene, tetradecyl benzene, etc.

The halogen derivatives aforementioned include such compounds as 2-chloropropane, 1-bromobutane, 1-iodopentane, 1-chloroheptane, 1-bromooctane; unsaturated halogen compounds such as allyl bromide, chloride, iodide and homologs thereof; and halogen substituted alkyl aromatics with the halogen substitution in the alkyl chain, e.g. 2-chloro-6-phenyl-butane, etc.

Although the selectivity to epoxy compounds is not as high with substituted hydrocarbon feedstocks as with hydrocarbon feeds, this process allows the production of valuable halogen substituted epoxides with insignificant loss via halogen displacement which has rendered prior art processes for the oxidation of such compounds as chloroparaffins costly and ineffective. The more difficulty oxidizable unsubstituted hydrocarbons include the alkyl aromatic hydrocarbons having few non-ring carbon atoms such as ethyl benzene, isopropyl benzene, short chain alkylated naphthalenes, etc., and the lower molecular weight aliphatic hydrocarbons, e.g. $C_3$ to $C_5$ paraffins such as propane, butane and pentane, $C_3$ to $C_5$ olefins such as propylene, butylene and pentene. Accordingly with these feedstocks it is preferable to employ reaction temperatures in the range of about 600° to 750° F.

More readily oxidizable hydrocarbons include the higher aliphatics, e.g. $C_6$ to $C_{20}$, such as hexane, heptane, octane, nonane, decane, dodecane, and so on up to the very high molecular weight paraffinic waxes. Similarly, olefins having the same number of carbon atoms, i.e. $C_6$ up to about $C_{20}$ are readily oxidizable as well as long chain alkyl aromatics such as tridecylbenzene, decylbenzene, and the like. These readily oxidizable compounds may be reacted at a substantially lower temperature generally in the range of 300° to 500° F. Cyclohydrocarbons such as cyclo-aliphatic and cyclo-olefinic, e.g. cyclopentane, cyclopentene, cyclohexane, cyclohexene, and methyl substituted derivatives thereof such as methylcyclohexane and the like, are intermediate in reactivity, and reaction temperatures in the range of 400° to 600° F. are preferred for these compounds. Particularly good selectivity to the epoxides may be obtained in the process of this invention employing the alkyl substituted, e.g. methyl substituted cycloparaffins. The aforementioned reaction temperatures are in general 150° to 300° F. higher than the initiation temperatures. While the lower limit of the operating temperature may be at the initiation temperature, at this temperature reaction rates are undesirably slow. The upper limit is dictated by the requirement of maintaining sufficiently low temperatures to have the higher selectivity to epoxidies and maintaining control of the reaction.

The oxygen containing gas in accordance with this invention when modified with the specific amounts of ozone appears to selectively attack the non-ring carbon atoms bridging them with an oxygen molecule forming epoxy structures. With, for example, hexane or hexene, dimethyl-tetrahydrofuran is formed in appreciable yields. With heptane, considerable quantities of 2-methyl-5-ethyl tetrahydrofuran are formed. Lower molecular weight alkyl or alkylene chains will form the lower molecular weight epoxy compounds.

Thus, the feed employable in this invention may be characterized as any organic compound having at least two carbon-to-carbon linkages which may be single, double or triple bond. Accordingly, acetylenes such as methyl-, ethyl-, vinyl- and the like are also amenable to the reaction. It is to be understood, however, that the product attained will vary considerably depending on the particular reactant employed. Although emphasis has been placed herein on obtaining various epoxy compounds, when certain compounds such as the highly aromatic compounds are used as fuel, there is a tendency to produce olefinic product. Thus, utilizing ethylbenzene which contains only two carbons in the alkyl chain, a major product obtained under the controlled conditions of this process will be styrene, resulting from oxidative dehydrogenation. Besides styrene, there will be obtained various oxygenated compounds such as benzaldehyde and acetophenone. By resort to the lower temperatures, cracking to lower molecular weight unsaturates is minimized.

Amounts of ozone below 0.05 volume percent are insufficient to modify the reaction, whereas amounts above 8 volume percent would effect ozonolysis of the feed under the conditions of reaction and would result in a serious reduction of epoxy product yield. Amounts of oxygen below the ratio hereinbefore set forth are generally insufficient to initiate the reaction. Amounts in excess lead to combustion of the feed.

Recovery of epoxy compounds from the reaction product mixture may be accomplished by conventional separation techniques. For example, the gaseous reaction mixture containing the valuable epoxy compounds may be passed from the reactor to a condenser to form a liquid product mixture. The small amounts of light uncondensable gases are then removed and the epoxy compounds separated by fractionation or extraction. The epoxy compounds generally boil at a temperature of 30°–40° F. higher than the corresponding feed. In the event side products or cracked products are produced which boil in the range of feedstock, the epoxy compounds may be separated by water extraction. Small amounts of olefins, carbonyls and other oxygenated compounds such as ketones and the like are formed and readily separated from the epoxy compounds or, if desired, the epoxy compounds containing reaction mixture may be utilized as an intermediate for the preparation of other chemicals. For example, the epoxy compounds may be isomerized to the ketones which are known octane improvers. By utilization of the specific amounts of ozone modifier, oxidation dehydrogenation is inhibited and partial oxidation is promoted.

To demonstrate the value of the present invention reference may be had to the following examples which demonstrate oxidation of various feedstocks in accordance with this invention and further compare the results of such oxidation with vapor phase oxidations wherein an ozone modifier is not employed.

Example 1 n-Hexane is preheated to 540° F. with oxygen employed at a ratio of 0.5 mole of $O_2$ per mole of the hexane. Reaction could not be started below 525° F. and in order to force the reaction to proceed at a reasonable rate, the temperature had to be maintained between 680° to 765° F. at atmospheric pressure. Average residence time for the reaction was about 0.5 second. A conversion of about 28.0% was obtained and the product was analyzed. The weight percent selectivity of converted feed to epoxides was 29.9% and to $C_4$-$C_6$ olefins was 20.0%. The remainder of the product mixture was uncondensable gases and other oxygenated compounds.

The oxidation of n-hexane was repeated employing 0.4 volume percent ozone based on oxygen at atmospheric pressure. With the ozone present to modify the reaction, it was possible to initiate the reaction at about 260° F. and the temperature was maintained at between about 450°–525° F. at the aforesaid pressure for a residence time of 0.5 second. In the product obtained the proportion of converted feed transformed to epoxides was approximately 81 weight percent. Other oxygenated compounds were also produced. No olefins were formed.

Example 2

An aliphatic olefin, i.e. n-hexene-1 was oxidized in an open tube reactor in the absence of ozone and in the presence of ozone with the following results:

| $O_2$ | | 0.5 mole $O_2$ per mole hexene |
|---|---|---|
| Initiator | None | 0.5 mole percent ozone (based on $O_2$ feed). |
| Temperature, ° F | 450 | 450. |
| Pressure | Atmospheric | Atmospheric. |
| Conversion, percent | 0 | 25. |
| Selectivity to Epoxides, percent | 0 | 85. |

It will be noted that at 450° F. hexene-1 did not react with oxygen to produce epoxides. In fact, the conversion under these conditions was essentially zero. Employing, however, only 0.5 mole percent of ozone on oxygen in the feed under identical conditions, a conversion of 25% with a selectivity to epoxides of 85% was achieved. In Example 2, a nitrogen containing inert gas was added to the reaction mixture as an aid in controlling temperature. Vapor-liquid partition chromatography and fluorescent intensity absorption were employed as analytical techniques to determine the products obtained and the conversions.

Example 3

To show the effect of ozone modification, n-hexane was partially oxidized in comparative examples at temperatures necessary in the individual reactions to effect a relatively rapid reaction. It will be noted that the temperatures required in the absence of ozone were substantially higher than that required employing ozone.

| $O_2$ | | $O_2$/Hexane=0.61 mole |
|---|---|---|
| Initiator | None | 0.15 mole percent ozone. |
| Temperature, ° F | 725 | 515. |
| Pressure | Atomospheric | Atomospheric. |
| Selectivity, Wt. percent on Feed Conversion: | | |
| $C_1$-$C_4$ Aldehydes | 38.1 | 16.3. |
| Alcohols | 3.8 | 6.0. |
| $C_6$ Epoxides | 29.9 | 81.1. |
| $C_4$-$C_6$ Olefins | 20.0 | 0.0. |
| $CO_2$ | 3.0 | 10.0. |
| CO | 15.0 | 2.9. |

The above examples show an increase in epoxide yield from 29.9 to 81.1% by the employment of ozone which makes possible lowering the temperature of reaction. Comparative runs further show that substantially no olefins were produced with the ozone modified reaction as compared to the production of 20% olefins in the absence of ozone. Additionally, the uncondensable gases were substantially lower in the process of this invention.

Example 4

Repeat the process of Example 1 employing propane as the hydrocarbon feedstock. Maintain the temperature at about 550° F. with a residence time of about 3 seconds. Employ ozone in an amount of approximately 1 volume percent based on the oxygen so as to obtain a high selectivity to epoxides. Without the ozone addition, the reaction will not be maintainable at this temperature.

Example 5

Methylcyclohexane was oxidized using ozone initiation. The conditions employed and the results obtained were as follows:

Temperature, ° F. _____ 405.
Pressure _____ Atmospheric.
$O_2$ hydrocarbon, mole ratio _____ 0.4.
$O_3$, vol. percent on oxygen feed _____ 0.15–0.25.
Hydrocarbon conversion, percent _____ 16.
Selectivities, wt. percent based
 on converted hydrocarbons:
  Epoxides _____ 93.
  Aldehydes and ketones _____ 17.
  Carbon oxides _____ 5.

Example 6

The scope of this invention is further demonstrated by the oxidation of light virgin naphthas in accordance with the process hereinbefore described. High epoxide selectivities at satisfactory conversion levels are thereby obtained.

A light virgin naphtha distillate from Arabian crude containing a mixture of various hydrocarbon compounds ranging from $C_6$ hydrocarbons to higher molecular weight hydrocarbons boiling to about 200° F. was oxidized at temperatures ranging from about 630° F. to 800° F. without employing ozone. The compounds in the mixture of this type vary in their resistance to oxidation. However, the presence of the more easily oxidized compounds affects the resistance of the other hydrocarbons and reaction of all components converted proceeds at a substantially uniform rate.

These reactions were carried out in the vapor phase without ozone modification. Selectivity to epoxides was found to increase with decreasing temperature. An epoxide selectivity of about 33% was obtained at 630° F. at 30% conversion. Increasing the reaction temperature to 795° F. resulted in a drop in epoxide selectivity to 26% at the same conversion level. A typical sample of the aforementioned light virgin naphtha distillate contains the following:

| Component: | Weight percent |
|---|---|
| Isopentane | 0.3 |
| n-Pentane | 2.5 |
| 2,2-dimethylbutane | 0.1 |
| 2-methylpentane, cyclopentane, 2,3-dimethylbutane | 13.8 |
| 3-methylpentane | 9.9 |
| n-Hexane | 33.5 |
| 2,4-dimethylpentane, methylcyclopentane, 2,2-dimethylpentane | 7.8 |
| 2-methylhexane, 3-methylhexane | 12.1 |
| 3-ethylpentane | 6.6 |
| n-Heptane | 8.7 |
| Methylcyclohexane | 1.3 |
| Aromatics | 3.5 |
| Total | 100.1 |

Repeat the above process with ozone added in an amount of about 0.2 volume percent based on oxygen feed. Maintain the reaction temperature at about 500° F. while employing an $O_2$/hydrocarbon ratio of about 0.3/1. Maintain conversion at about 30 weight percent. Selectivity to epoxides will be in the range of 70 to 80 weight percent on hydrocarbon feed reacted.

*Example 7*

Chloropentane was oxidized in accordance with the process of this invention employing an $O_2$/chloropentane ratio of 0.48 with the following results:

| Initiator | None | 1 mole percent ozone (based on $O_2$ feed). |
|---|---|---|
| Temperature, °F | | 560. |
| Pressure | Atmospheric | Atmospheric. |
| Conversion, percent | 0 | 15.7. |
| Oxy Compounds | | 53.0. |
| Chloroepoxides | | 39.9. |

When it was attempted to partially oxidize a chloroparaffin in the absence of ozone at higher temperatures necessary without ozone, 15 to 25% of the feed degraded to hydrogen chloride. In the above modified example, only 0.1% of the feed was converted to HCl.

Similar results with bromine and iodine substituted hydrocarbons will provide corresponding results.

*Example 8*

Nonyl benzene is partially oxidized in vapor phase employing 0.5 mole $O_2$ per mole of hydrocarbon feed at a temperature in the range of 600° to 750° F. The reaction is repeated except that it is carried out in the presence of 0.5 volume percent ozone based on the $O_2$ employed. Selectivity to epoxide in the reaction products is markedly increased when ozone is employed.

The scope of the invention is particularly pointed out in the appended claims.

What is claimed is:

1. In a non-catalytic process for partially oxidizing an organic compound selected from the group consisting of $C_3$ to $C_{20}$ aliphatic hydrocarbons and $C_8$ to $C_{20}$ alkyl substituted aromatic hydrocarbons having an alkyl substituent containing at least 2 carbon atoms with a gas containing molecular oxygen, the improvement which comprises contacting said compound in vapor phase with 0.05 to 2.0 moles of $O_2$ per mole of said compound at a temperature in the range of 300° to 750° F. for up to about 10 seconds in the presence of 0.05 to 8 volume percent ozone based on oxygen and recovering oxygen-containing organic compounds the major proportion of which are epoxy compounds from the reaction products.

2. A process in accordance with claim 1 wherein said ozone is present in an amount in the range of 0.1 to 1.0 volume percent based on oxygen.

3. A process in accordance with claim 1 wherein said $C_3$ to $C_{20}$ aliphatic hydrocarbon is a $C_6$ to $C_{20}$ paraffin.

4. A process in accordance with claim 1 wherein said $C_3$ to $C_{20}$ aliphatic hydrocarbon is a $C_6$ to $C_{20}$ olefin.

5. A process in accordance with claim 1 wherein said temperature is in the range of 300° to 600° F.

6. In a process for partially oxidizing a $C_3$ to $C_{20}$ aliphatic hydrocarbon with a gas containing molecular oxygen, the improvement which comprises contacting said hydrocarbon in vapor phase with 0.05 to 2.0 moles of $O_2$ per mole of said hydrocarbon at a temperature in the range of 300° to 750° F. for 0.01 to 10 seconds in the presence of 0.05 to 8 volume percent ozone based on oxygen and recovering oxygen-containing organic compounds the major proportion of which are epoxy compounds from the reaction products.

7. A process in accordance with claim 6 wherein said temperature is in the range of 300° to 500° F.

8. A process in accordance with claim 6 wherein said aliphatic hydrocarbon is an alkyl substituted cycloaliphatic hydrocarbon and said temperature is in the range of 400° to 600° F.

9. A process in accordance with claim 8 wherein said alkyl substituted aliphatic hydrocarbon is methycyclohexane.

10. A process in accordance with claim 6 wherein said ozone is present in an amount in the range of 0.1 to 1 volume percent based on oxygen.

11. A process in accordance with claim 6 wherein said aliphatic hydrocarbon is hexane.

12. In a process for partially oxidizing a $C_8$ to $C_{20}$ alkyl substituted aromatic hydrocarbon having an alkyl substituent containing at least two carbon atoms with a gas containing molecular oxygen, the improvement which comprises contacting said hydrocarbon in vapor phase with 0.05 to 2.0 moles of $O_2$ per mole of said hydrocarbon at a temperature in the range of 300° to 750° F. for a few seconds in the presence of 0.05 to 8 volume percent ozone based on oxygen and recovering oxygen-containing organic compounds the major proportion of which are epoxy compounds from the reaction products.

13. A process in accordance with claim 12 wherein said temperature is in the range of 600° to 750° F.

References Cited in the file of this patent

UNITED STATES PATENTS

| 1,995,991 | Lenher | Mar. 26, 1935 |
| 2,416,156 | Cook | Feb. 18, 1947 |
| 2,770,637 | Mitchell et al. | Nov. 13, 1956 |
| 2,808,422 | Ritter et al. | Oct. 1, 1957 |

FOREIGN PATENTS

| 534,525 | Great Britain | Mar. 10, 1941 |

OTHER REFERENCES

Briner et al.: Helv. Chim. Acta., vol. 15 (1932), pp. 201–13.

Briner et al.: Helv. Chim. Acta., vol. 18 (1935), pp. 973–81.

Briner et al.: Helv. Chim. Acta., vol. 21 (1938), pp. 95–108.

Briner et al.: Helv. Chim. Acta., vol. 23 (1940), pp. 590–6.

Bergman: Chem. of Acetylene and Related Compounds (Interscience, 1948), page 80.